United States Patent [19]
Mizikovsky

[11] Patent Number: 5,943,425
[45] Date of Patent: Aug. 24, 1999

[54] RE-AUTHENTICATION PROCEDURE FOR OVER-THE-AIR ACTIVATION

[75] Inventor: Semyon B. Mizikovsky, Morganville, N.J.

[73] Assignee: Lucent Technologies, Inc., Murray Hill, N.J.

[21] Appl. No.: 08/681,753

[22] Filed: Jul. 29, 1996

[51] Int. Cl.[6] .............................. H04L 9/32; H04L 9/00; H04Q 7/22

[52] U.S. Cl. ................................. 380/25; 380/9; 380/23; 380/49; 375/200; 455/403; 455/410; 455/418; 455/419; 455/422

[58] Field of Search ..................... 455/403, 410, 455/411, 418, 419, 422, 424, 425, 435, 415; 375/200, 201, 202, 203, 204, 206, 207, 208, 209, 210; 380/9, 23, 25, 30, 49, 50, 59, 29

[56] References Cited

U.S. PATENT DOCUMENTS

| 5,774,804 | 6/1998 | Williams | 455/419 |
| 5,793,866 | 8/1998 | Brown et al. | 380/30 X |
| 5,794,142 | 8/1998 | Vanttila et al. | 455/419 |

OTHER PUBLICATIONS

TIA Standard IS–683, Over–The–Air Service Provisioning of Mobile Stations in Wideband Spread Spectrum Systems, May 9, 1996.

S. Mizikovsky, Re–Authentication Procedure for OTA, contributed to TIA task group 45.5.2.3, Mar. 16, 1995.

"Over–the–Air Activation of Mobile Stations in Wideband Spread Spectrum Cellular Systems," Intermediate Working Draft of TIA standard IS–683, May 11, 1995.

TIA/EIA/IS–95–A, Mobile Station–Base Station Compatibility Standard for Dual–Mode Wideband Spread Spectrum Cellular System, pp. 1 through Appendix A ii.

TR45.0.A, Interface Specification for Common Cryptographic Algorithms, Telecommunications Industry Association, Jan. 1996.

*Primary Examiner*—Bernarr E. Gregory

[57] ABSTRACT

A method and system for providing OTA during the service origination call, wherein the mobile station performs an authentication procedure in response to a re-authentication message received, using shared secret data known to the mobile station and the system infrastructure and data in the re-authentication message to compute an authentication response. The response is transmitted to the base station, which compares it with an internally generated authentication response, and, if they match, privacy activation procedures, such as message encryption or voice masks, are initiated.

34 Claims, 3 Drawing Sheets

FIG. 4
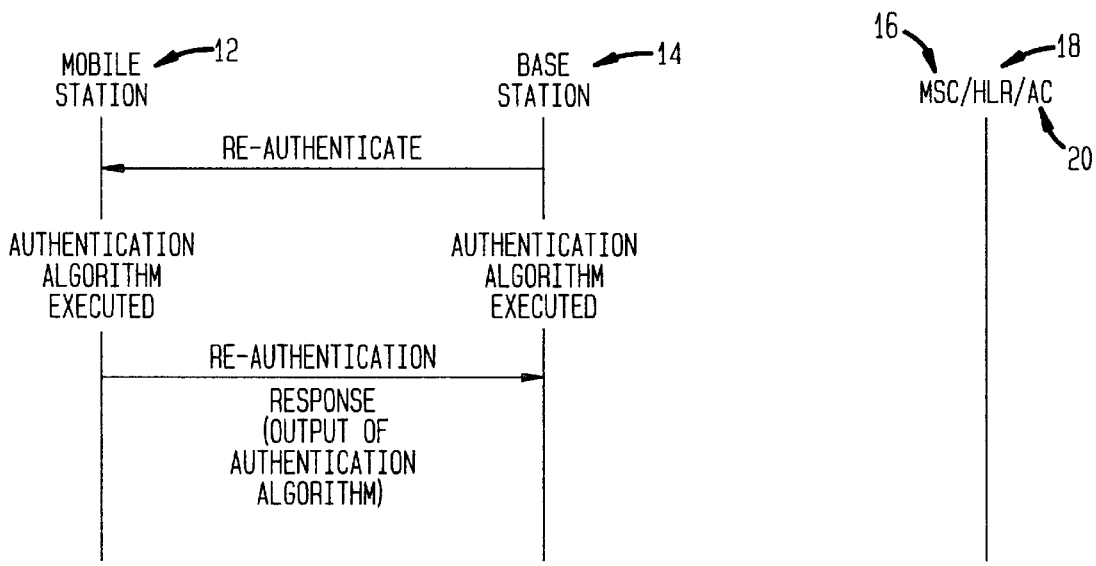
FIG. 5
| RAND_CHALLENGE | ESN | AUTH_DATA | SSD_AUTH | SAVE_REGISTERS |
|---|---|---|---|---|
| RANDs 32 | ESN 32 | DIGITS 24 | SSD_A 64 | TRUE |
FIG. 6
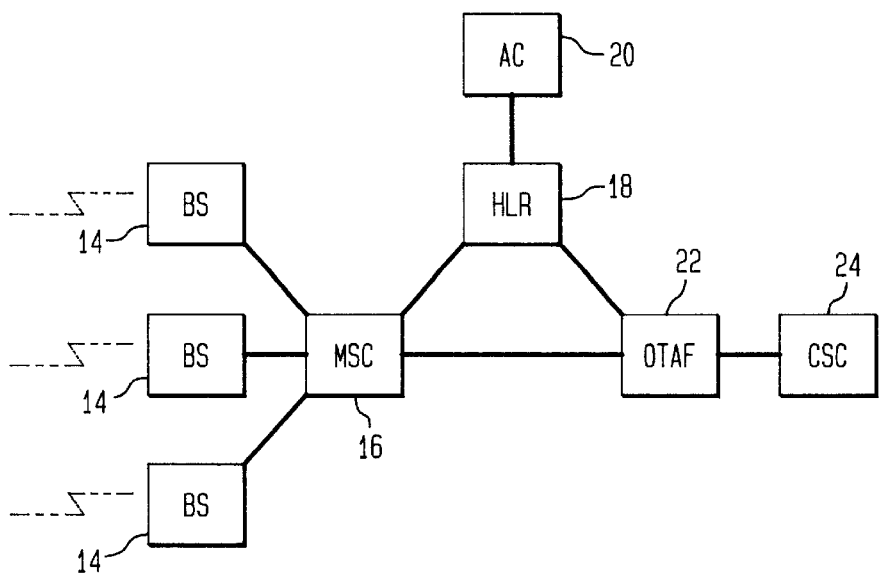

RE-AUTHENTICATION PROCEDURE FOR OVER-THE-AIR ACTIVATION

FIELD OF THE INVENTION

The present invention relates to the initiation of message encryption and voice privacy during the over-the-air activation of new wireless mobile stations.

BACKGROUND OF THE INVENTION

Over-the-air activation ("OTA") refers to a procedure that allows a prospective subscriber of a new wireless service to gain authorized access to the service through the wireless system itself. The alternative to OTA is often much more time consuming, such as gaining access to a new system through an authorized dealer.

OTA requires the exchange of billing-related information between the prospective customer and the authentication center of the wireless system. This information, of course, is private and sensitive. Should it be intercepted during the exchange, it may be used to fraudulently gain access to another wireless system. Accordingly, OTA procedures require that such billing-related information be exchanged over a protected wireless channel.

For many wireless systems, such as those characterized as CDMA cellular systems, the generation of valid privacy masks (such as voice privacy and message encryption on the traffic channel) may only be accomplished at the time of call setup (e.g., during call origination or termination). For OTA, however, the authentication parameters are not valid for the first activation call setup, so privacy masks cannot be generated during the first call.

To accommodate this limitation in a cellular setting, for example, the task may be accomplished through a "Re-Origination" procedure. The Re-Originate message causes the mobile to release the initial service call and then to automatically call back the activation center of the wireless system. For the subsequent call, an "authentication" procedure is initiated by the system, using shared secret data ("SSD") known only to the system and the mobile station (as well as other data). If the output of the procedure generated and transmitted by the base station matches the result of the same procedure performed internally by the system, then the identity of the mobile station used by the caller is authenticated, and the proper masks are generated by the system. Sensitive data may then be transmitted.

SUMMARY OF THE INVENTION

The Re-Origination aspect of OTA is deficient because releasing the initial service request call and automatically originating a second call to generate the privacy mask is a relatively inefficient procedure. Not only is the procedure inefficient, in certain circumstances it may not work. For dual mode CDMA systems, for example, a subsequent call might end up on the analog channel, where no privacy masks are available. This, of course, would allow for interception of any sensitive data that is transmitted, thus defeating the very purpose of the Re-Origination procedure.

Also, releasing the first call and automatically originating a second call, as required by the Re-Origination procedure, means that the mobile station maintains an additional "intermediate" state during the activation process. This is not consistent with the call processing logic defined in IS-95-A. TIA/EIA/IS-95-A ("IS-95-A") is a comprehensive standard for the cellular industry, entitled "Mobile Station—Base Station Compatibility Standard For Dual-Mode Wideband Spread Spectrum Cellular System.")

Embodiments of the present invention provide a re-authentication procedure that eliminates the need to release the initial service call and originate a second call in order to generate privacy masks during OTA.

As applied to the wireless system, a particular embodiment of over-the-air activation includes first receiving an originate activation message transmitted from a mobile station. Newly established authentication parameters are exchanged between the wireless system and mobile station. These parameters may include the A-key, SSD, or both. A re-authentication message (which includes downloaded data for use in further processing by the mobile station) is transmitted from the wireless system to a mobile station. The wireless system generates an internal response to the re-authentication message sent to the mobile station using the downloaded data and data that is mutually known to the system and the mobile station. The system also receives a response from the mobile station to the re-authentication message sent to the mobile station and compares it with the response generated internally. If they match, authentication is successful, and privacy masks are generated.

As applied to the mobile station seeking OTA for a wireless system, a particular embodiment includes first transmitting an originate activation message to a wireless system. Newly established authentication parameters are exchanged between the wireless system and mobile station. These parameters may include the A-key, SSD, or both. A re-authentication message (which includes downloaded data for use in further processing by the mobile station) is received at the mobile station transmitted from the wireless system. The mobile station generates a response to the re-authentication message sent using the downloaded data and data that is mutually known to the wireless system and the mobile station. The mobile station then transmits the response to the system.

BRIEF DESCRIPTION OF THE FIGURES

The features of the present invention will be better understood and become readily apparent by referring to the following detailed description of an illustrative embodiment of over-the-air activation, in conjunction with the accompanying drawings, in which:

FIG. 4 is a representative illustration of a re-authentication procedure used in an embodiment of the present invention; and FIG. 5 is a representative illustration of an input to an authentication procedure used in an embodiment of the present invention.

FIG. 6 is a conceptual diagram of a wireless communications system that includes an Over-the-Air Activation Function (OTAF).

DETAILED DESCRIPTION

Figure 1:
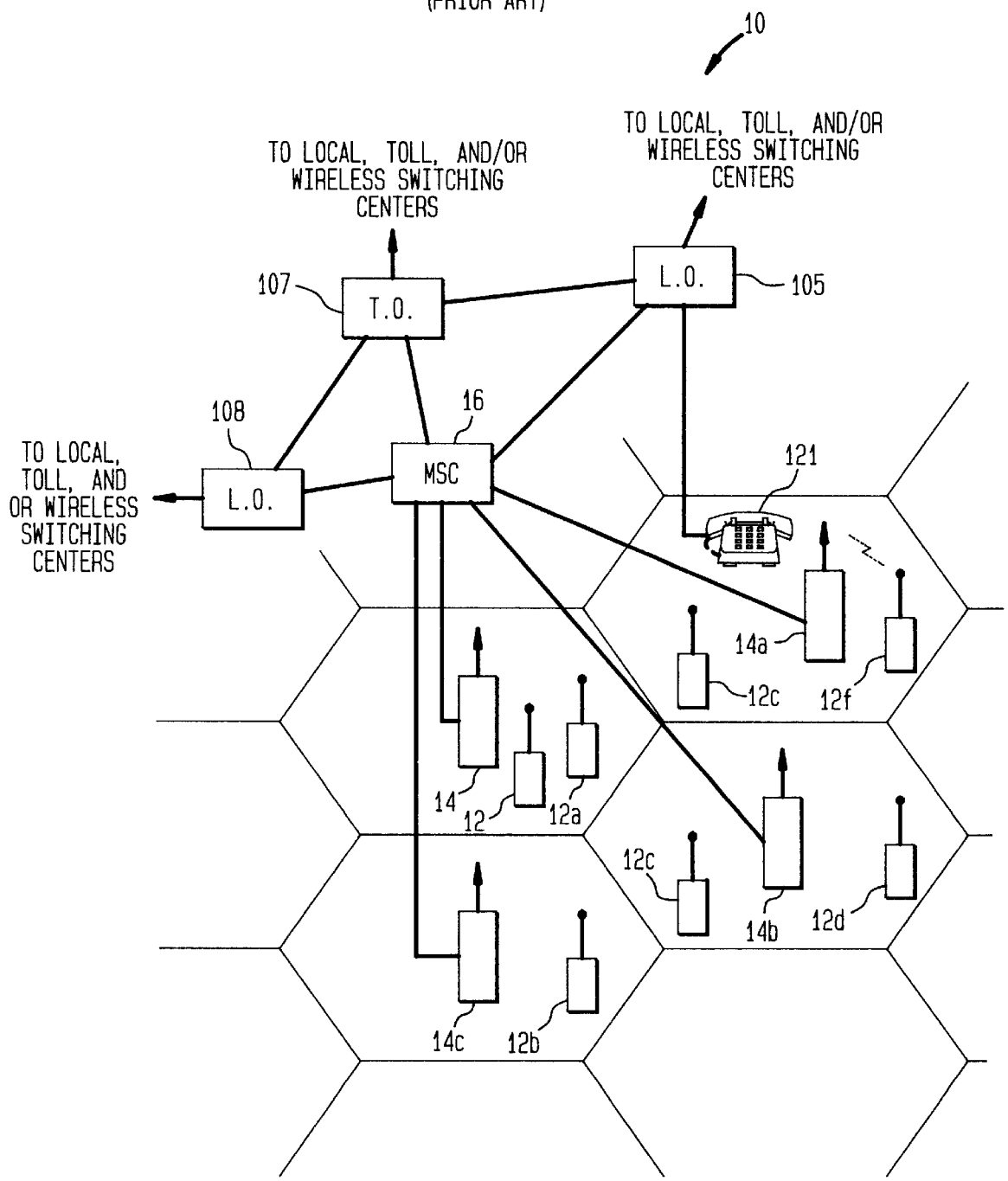
FIG. 1 is a representative diagram of a prior art wireless communications system.

FIG. 1 presents a representative diagram of a portion of a typical wireless communications system 10. The system 10 serves a number of wireless and wireline terminals within a geographic area. System 10 includes mobile switching center 16 ("MSC"). Mobile switching center 16 is interconnected with local switching offices 103, 105, which access wireline terminals. Mobile switching center 16 is also interconnected with toll switching office 107, which interconnects local switching offices 103, 105 and mobile switching center 16 with other local switching offices and wireless switching centers (neither shown in FIG. 1).

MSC 16 is connected to a number of base stations 14–14c, which are dispersed throughout a geographic area serviced by communications system 10. Mobile switching center 16 is responsible for, among other things, routing or "switching" calls between wireless communications terminals (or mobile stations) or, alternatively, between a wireless communications terminal and a wireline terminal, which is accessible to mobile switching center 16 through local switching office 103, 105 and/or toll switching office 107.

The geographic area serviced by system 10 is partitioned into a number of spatially distinct regions called "cells." As depicted in FIG. 1, each cell is represented by a hexagon. (In actuality, each cell normally has an irregular shape that depends on terrain, electromagnetic sources, and numerous other factors.) Each cell is shown to include a base station 14–14c. Each base station 14–14c includes antennas and radios for communicating with mobile stations within the cell and also includes transmission equipment for communicating with mobile switching center 16.

Mobile stations 12–12f communicate via one or more wireless access technologies (e.g., FDMA, TDMA, CDMA) in providing one or more services (e.g., cordless, cellular, PCS, wireless local loop, SMR/ESMR, two-way paging, etc.) with signals that represent one or more kinds of information (e.g., audio, video, data, multimedia, etc.).

Figure 2:
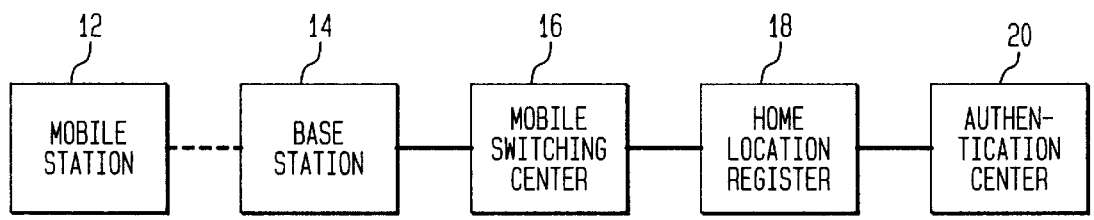
FIG. 2 is a representative illustration of components of a prior art wireless communications system that support embodiments of the present invention.

FIG. 2 presents a representative illustration of select components and communications links within a prior art wireless system, such as that shown in FIG. 1, and a mobile station. In FIG. 2, a mobile station 12, such as a cellular telephone, interfaces by airwave transmissions with base station 14 servicing the cell that mobile station 12 is located within. Base station 14 is shown interconnected with mobile switching center 16.

MSC 16 interfaces with a home location register ("HLR") 18 and an authentication center ("AC") 20. Home location register 18 and authentication center 20 contain certain configuration and security data, respectively, for the mobile station 12.

The base station 14, mobile switching center 16, home location register 18 and authentication center 20 are all components of the wireless system infrastructure. (As noted above, mobile switching center 16 performs a host of switching functions within the wireless system, and with other systems. These functions are omitted from FIG. 2 in order to focus attention on the pertinent components that may support embodiments of the present invention.)

Figure 3:
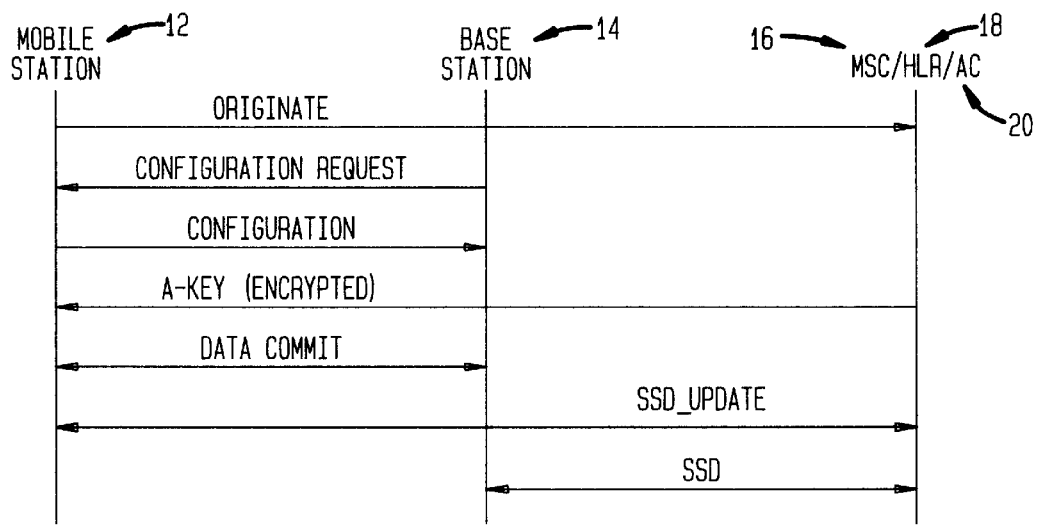
FIG. 3 is a representative illustration of communications and procedures between components making up a wireless communications system that support embodiments of the present invention.

FIG. 3 is a representative drawing that is an overview of the preferred steps preceding the Re-Authentication procedure that is part of the OTA of the present invention. The steps illustrated in FIG. 3 are analogous to the steps presently taken prior to the CDMA "Re-Origination" procedure. In FIG. 3 (and FIG. 4, below), the base station 14 is separated from the other pertinent components (mobile switching center 16, home location register 18, authentication center 20) of the wireless system in order to facilitate the description.

In FIG. 3, mobile station 12 is not authorized to use the wireless system that includes base station 14, mobile switching center 16, home location register 18 and authentication center 20. In order to initiate activation of the service, mobile station 12 transmits an "Originate Activation" message to the base station 14. (In practice, this may be initiated by the operator of the mobile station 12 by dialing a number on the keypad of the mobile station 12.) The Originate Activation message includes data that enables the wireless system to access configuration information pertinent to the mobile station 12 within the home location register 18 and security information pertinent to the mobile station 12 within authentication center 20. The information pertaining to the mobile station 12 stored in the authentication center 20 includes the "mutually known" parameters identified below.

After receipt of the Originate Activation message by base station 14, data, including configuration data relating to the network and an authentication parameter or A-key (originating in the authentication center 20), is downloaded from the base station 14 to the mobile station 12. If the download is successful, a "Data Commit" procedure may be used to permanently update the downloaded data in the mobile station 12.

Also prior to the Re-Authentication procedure described below, the shared secret data ("SSD") in the mobile station 12 and the authentication center 20 may be updated. An update procedure such as "SSD_UPDATE" of IS-95-A may be initiated by the authentication center 20. The SSD_UPDATE procedure generates SSD using data that is downloaded to the mobile station 12 (such as the A-key) and data that is mutually known to the mobile station 12 and authentication center 20 (such as the International Mobile Subscriber Identity ("IMSI") or Mobile Identification Number ("MIN"), Random Challenge value ("RANDSSD"), and electronic serial number ("ESN"). Because the SSD_UPDATE algorithm uses data that is both downloaded to the mobile 12 and mutually known to the authentication center 20 and the mobile 12 (but not downloaded to the mobile), the particular output of the algorithm can only be generated by the mobile 12 and the authentication center 20. Thus, the output of the SSD_UPDATE procedure is SSD.

The SSD from the authentication center 20 is transferred to the memory of the base station 14. (Alternatively, the mutually known data used in the SSD_UPDATE algorithm may be transferred from the authentication center 20 to the base station 14 and the algorithm may be performed by the base station 14. The SSD would then be generated at the base station 14, not transferred to the base station 14 from the authentication center 20.)

FIG. 4 is a representative drawing of a Re-Authentication procedure for a wireless system that is part of a preferred embodiment the present invention. As noted, the Re-Authentication procedure is undertaken for the purposes of confirming that the mobile station 12 and the base station 14 possess corresponding sets of SSD.

A Re-Authenticate message is sent from the base station 14 to the mobile station 12. In response, the mobile station 12 sets the input parameters for an authentication algorithm and calculates a Re-Authentication response. The base station 14 independently performs the same authentication algorithm, using the same input parameters. The input parameters to the authentication algorithm may include data transmitted as part of the Re-Authenticate message and data that is mutually known to the base station 14 and mobile 12. Data that is mutually known that is used as an input parameter includes, among other things, the SSD. As the SSD is only known to the mobile 12 and the base station 14, the particular output of the authentication algorithm may only be generated by the mobile 12 and the base station 14.

The output of the authentication algorithm is used to construct the mobile station's response to the Re-Authentication message. Base station 14 compares the received Re-Authentication response with its independently calculated output of the authentication algorithm. If the two correspond, authentication is successful, and privacy masks may be enabled, as described further below.

Authentication algorithms are well-known in the wireless communications art. Many that are presently used are described, for example, in the publication "Common Cryptographic Algorithms," available to those skilled in the art from the Telecommunications Industry Association. One such authentication algorithm, that is described in the above-referenced publication and that may be used in the Re-Authentication procedure described above, is the AUTH_SIGNATURE procedure. FIG. 5 is a representative drawing of the particular input parameters that would be used in the AUTH_SIGNATURE procedure by the mobile station 12 (in response to the Re-Authentication message) and, independently, the base station 14.

FIG. 5 shows that the RAND_CHALLENGE input parameter of the AUTH_SIGNATURE procedure is set to the value of $RAND_S$, which would be received by the mobile 12 as part of the Re-Authentication message. In other words, one of the actions that the wireless system takes in response to the Originate Activation message is to generate a random number, typically a 32-bit random number, which for convenience will hereinafter be denoted "RAND". The number RAND is transmitted by the wireless system to the mobile station as part of the Re-Authentication message. When the mobile station downloads the number RAND, it stores it in a memory location symbolically designated $RAND_S$. The mobile station hen invokes the number stored in $RAND_S$ and uses it as the RAND_CHALLENGE input parameter, as explained above.

Within the wireless system, RAND is typically generated within a unit referred to as the "Over-the-Air Activation Function (OTAF)". As illustrated in FIG. 6, OTAF 22 is typically in direct communication with home location register 18 and mobile switching center 16. OTAF 22 is also typically in direct communication with customer service center (CSC) 24. (Alternatively, the OTAF may be incorporated with HLR 18 or MSC 16.) The CSC is the location where customer-service operators can receive activation calls and can engage in voice conversations with customers pertaining to the data connections to customer mobile stations.

The number RAND is preferably generated once and only once for each transaction that is initiated by an Originate Activation message. Thus, RAND is not only personal to the mobile station seeking authorization, but it is also unique to the specific transaction being attempted. (If the attempt fails, a new RAND will be generated when a new Originate Activation message is received.) The effect of RAND, when used as the RAND_CHALLENGE input parameter, is to randomize the output of the authentication algorithm. A procedure that uses a unique RAND for each transaction offers the greatest randomization, and avoids the frustrations that may attend the conventional use of Random Challenge numbers when a mobile station attempts to use an old Random Challenge value that is no longer valid.

It is significant in this regard that the wireless system will typically transmit the Re-Authentication message, including RAND, on the traffic channel (i.e., the voice channel), and not on the control channel. Whereas messages on the control channel are broadcast to, for receipt by, many mobile stations, messages on the traffic channel are transmitted at frequencies personal to individual mobile stations. Thus, the likelihood is reduced that an eavesdropper could intercept the Re-Authentication data and use them for a fraudulent transaction.

The RAND generation and transmission procedures described above are distinct from those current practices in which a Global Random Challenge number is transmitted for the purpose of randomizing mobile station signatures. That is, at least some wireless systems in current use broadcast a Global Random Challenge number, on the control channel, to all mobile stations within a geographical area served by a base station or MSC. Such a Global Random Challenge number is typically changed periodically, e.g., monthly. It is clear that such practices lack the personal and unique character of the procedures described above.

The ESN parameter is set to the value of the mobile station's 12 electronic serial number, which is also available to the base station 14 from the authentication center 20.

The AUTH_DATA parameter may contain an encoded transformation of the last six digits transmitted by the mobile station 12 in the origination message at the time of the service request. Thus the parameter may contain the last six digits contained in the CHARi fields of the origination message. For encoding, if one of the six digits is a number, or the "*" or "#" characters, then it may be encoded according to Table 6.7.1.3.2.4–4 of IS-95-A. All other characters may be converted to their decimal equivalents (treated as an unsigned binary number), and the least significant digit of the decimal equivalent may be encoded according to the above-referenced table.

(If fewer than six digits are included in the origination message, then the most significant bits of IMSI_S1 active at the time the Re-Authentication message is received may be used to replace the missing digits. Procedurally, IMSI_S1 may initially be used to fill the AUTH_DATA input parameter completely, and the least significant four bits of AUTH_DATA are then replaced with the last dialed digit, the next four bits are replaced with the next to last dialed digit (if any), etc.)

The SSD_AUTH input parameter is filled with SSD_A. As noted above, the SSD is separately generated by, and only known to, the mobile station 12 and the authentication center 20. It is sent to the base station 14 by the authentication center 20 (if it is not generated by the base station 14 itself, or previously transmitted from the authentication center 20).

The SAVE_REGISTERS input parameter is set to "True."

As noted and shown in FIG. 4, both the mobile station 12 and the base station 14 separately execute the authentication procedure, for example, the AUTH_SIGNATURE procedure. The output of the authentication procedure, AUTHR for the AUTH_SIGNATURE procedure, is sent from the mobile station 12 to the base station 14 as the mobile station's 12 Re-Authentication response. If the value of the response corresponds to the value of AUTHR as determined independently by the base station 14, then authentication is successful.

If authentication is successful, then message encryption and/or voice privacy is activated without releasing the call. Appendix A of IS-95-A, for example, lists messages and fields to be encrypted in order to protect sensitive subscriber information for CDMA. And section 7.3.12.2 of IS-95-A gives procedures whereby the base station 14 may enable message encryption and voice privacy. The data used to initialize the algorithm for calculating message encryption parameters and voice privacy is computed based on parameters in effect at the time the Re-Authentication message was sent.

It will be understood that various modifications can be made to the various embodiments of the present invention herein disclosed without departing from its spirit and scope. As noted above, for example, the invention is applicable to other air interfaces between a mobile station or wireless terminal and the wireless system. This includes, for example, AMPS, GSM, N-AMPS, TDMA and FDMA, as well as the cellular service for CDMA described in IS-95-A. Also, there is a wide range of steps and the order of those steps that may be chosen to make up the present invention, and all such combinations would fall within the scope of the present invention. Therefore, the above description should not be construed as limiting the invention but merely as presenting preferred embodiments of the invention. Those skilled in the art will envision other modifications within the spirit and scope of the present invention as defined by the claims below.

The invention claimed is:

1. A method of operating a wireless telecommunications system comprising:
   (a) receiving an originate activation message transmitted from a mobile station;
   (b) generating a random number RAND string in response to said originate activation message, such that any given originate activation message leads to the generation of one and only one random number RAND string;
   (c) transmitting a re-authentication message to said mobile station wherein said re-authentication message comprises said random number RAND string;
   (d) generating an expected response based on said random number RAND string;
   (e) receiving an actual response from said mobile station, which said actual response is generated by said mobile station based on said re-authentication message; and
   (f) comparing said actual response to said expected response.

2. The method of claim 1, wherein the step of transmitting a re-authentication message comprises transmitting said re-authentication message from a base station.

3. The method of claim 1, wherein said expected response is also based on shared secret data.

4. The method of claim 3, wherein the step of transmitting a re-authentication message is preceded by the step of updating said shared secret data in said wireless telecommunications system.

5. The method of claim 4, wherein the step of transmitting a re-authentication message is preceded by the step of transmitting a shared secret data update message to said mobile station.

6. The method of claim 5, wherein the step of transmitting said shared secret data update message to said mobile station is preceded by the step of transmitting an A-key from said wireless telecommunications system to said mobile station.

7. The method of claim 1, wherein the step of generating an expected response comprises performing an authentication algorithm.

8. The method of claim 7, wherein the step of generating an expected response comprises performing the AUTH_SIGNATURE authentication algorithm.

9. The method of claim 8, wherein the step of generating an expected response comprises generating the AUTHR output of the AUTH_SIGNATURE algorithm.

10. The method of claim 1, wherein all steps occur during an activation call initiated by said mobile station to said wireless telecommunications system.

11. The method of claim 10, further comprising: enabling a voice privacy mask in said wireless system when said actual response corresponds to said expected response.

12. The method of claim 10, further comprising enabling message encryption parameters in said wireless telecommunications system when said actual response corresponds to said expected response.

13. The method of claim 10, wherein said wireless telecommunications system is able to transmit on a control channel and on a traffic channel, and the step of transmitting a re-authentication message comprises transmitting said re-authentication message on said traffic channel.

14. A method of operating a mobile station comprising:
   (a) transmitting an originate activation message to a wireless telecommunications system;
   (b) receiving a re-authentication message from said wireless telecommunications system that comprises a random number RAND string that was generated in said wireless telecommunications system in response to the receipt by said wireless telecommunications system of said originate activation message;
   (c) generating an actual response to said re-authentication message based on said random number RAND string; and
   (d) transmitting said actual response to said wireless telecommunications system.

15. The method of claim 14, wherein the step of receiving a re-authentication message from said wireless telecommunications system comprises receiving said re-authentication message from a base station.

16. The method of claim 14, wherein said actual response is based on shared secret data.

17. The method of claim 16, wherein the step of receiving a re-authentication message is preceded by the step of updating said shared secret data in said mobile station.

18. The method of claim 17, wherein the step of receiving a re-authentication message is preceded by the step of updating said shared secret data in said wireless telecommunications system.

19. The method of claim 18, wherein the step of updating is preceded by the step of receiving an A-key.

20. The method of claim 14, wherein the step of generating a response to said re-authentication message comprises performing an authentication algorithm.

21. The method of claim 20, wherein the step of generating a response to said re-authentication message comprises performing an AUTH_SIGNATURE authentication algorithm.

22. The method of claim 21, wherein the step of generating a response to said re-authentication message comprises generating an AUTHR output of said AUTH_SIGNATURE algorithm.

23. The method of claim 14, wherein all steps occur during a first call initiated by said mobile station to said wireless telecommunications system.

24. The method of claim 14, wherein said wireless telecommunications system is able to transmit on a control channel and on a traffic channel, and the step of receiving a re-authentication message comprises receiving said re-authentication message on said traffic channel.

25. A wireless telecommunications system comprising:
   (a) a receiver configured to receive an originate activation message transmitted by a mobile station and an actual response transmitted by said mobile station;

(b) means for generating a random number RAND string in response to the receipt of said originate activation message, such that any given originate activation message leads to the generation of one and only one random number RAND string;

(c) processing means configured to generate a re-authentication message that comprises said random number RAND string;

(d) transmitting means configured to transmit said re-authentication message to said mobile station;

(e) computing means to generate an expected response to said re-authentication message using said random number RAND string; and (f) means for comparing said actual response to said expected response.

26. The system of claim 25 wherein said receiver is in a base station.

27. The system of claim 25 wherein said transmitting means is in a base station.

28. The system of claim 25 wherein said computing means is in a base station.

29. The system of claim 25 wherein said expected response is based on shared secret data.

30. The system of claim 25 further comprising means for enabling a voice privacy mask when said actual response corresponds to said expected response.

31. The system of claim 25 further comprising means for enabling message encryption parameters when said actual response corresponds to said expected response.

32. The system of claim 25, wherein said transmitting means is able to transmit on a control channel and on at least one traffic channel, and said transmitting means are configured to transmit said re-authentication message on said at least one traffic channel.

33. A mobile station comprising:

(a) a transmitter configured to transmit an originate activation message and an actual response to a wireless telecommunications system;

(b) a receiver configured to receive a re-authentication message comprising a random number RAND string generated in response to the originate activation message; and (c) computing means for generating said actual response to said re-authentication message based on said random number RAND string.

34. The system of claim 33 wherein said actual response is also based on shared secret datum.

* * * * *

UNITED STATES PATENT AND TRADEMARK OFFICE
CERTIFICATE OF CORRECTION

PATENT NO. : 5,943,425  Page 1 of 1
DATED : August 24, 1999
INVENTOR(S) : Semyon B. Mizikovsky It is certified that error appears in the above-identified patent and that said Letters Patent is hereby corrected as shown below:

<u>Column 1,</u>
After line 3 and before "FIELD OF THE INVENTION", add

-- CROSS REFERENCE TO RELATED APPLICATIONS

This application claims the benefit of U.S. Provisional Application No. 60/017,469, now abandoned, filed by S.B. Mizikovsky on May 10, 1996 and entitled
"Re-Authentication Procedure for Over-the-Air Activation".

After [22] Filed: Jul. 19, 1996, add:
-- Related U.S. Application Data
Provisional Application No. 60/017,469, filed on May 10, 1996. --

Signed and Sealed this

Seventeenth Day of February, 2004

JON W. DUDAS
*Acting Director of the United States Patent and Trademark Office*